United States Patent
Chen et al.

(10) Patent No.: US 7,939,155 B2
(45) Date of Patent: May 10, 2011

(54) ORGANIC OPTO-ELECTRONIC POLYMER AND USE THEREOF

(75) Inventors: Ruei-Tang Chen, Kaohsiung (TW); Yu-Tsai Hsieh, Kaohsiung (TW)

(73) Assignee: Eternal Chemical Co., Ltd., Taiwan (CN)

( * ) Notice: Subject to any disclaimer, the term of this patent is extended or adjusted under 35 U.S.C. 154(b) by 425 days.

(21) Appl. No.: 11/647,706

(22) Filed: Dec. 29, 2006

(65) Prior Publication Data

US 2007/0167614 A1 Jul. 19, 2007

(30) Foreign Application Priority Data

Dec. 30, 2005 (TW) .............................. 94147765 A (51) Int. Cl.
*B32B 9/00* (2006.01)
(52) U.S. Cl. ............ 428/90; 430/58.05; 430/72; 585/26
(58) Field of Classification Search .................... 528/401
See application file for complete search history.

(56) References Cited

U.S. PATENT DOCUMENTS

| 2004/0170861 A1* | 9/2004 | Culligan et al. .............. 428/690 |
| 2006/0183042 A1* | 8/2006 | Huang et al. ............... 430/58.05 |

* cited by examiner

*Primary Examiner* — Randy Gulakowski
*Assistant Examiner* — Shane Fang
(74) *Attorney, Agent, or Firm* — Ladas & Parry LLP (57) ABSTRACT

An organic opto-electronic polymer having the structure of formula (I) is provided:

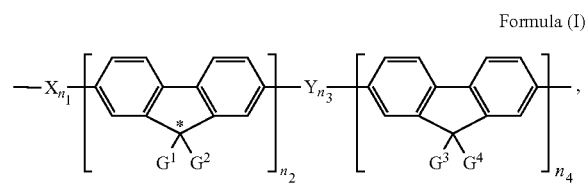

Formula (I)

The polymer can be used in the light-emitting layer of an organic light-emitting element as a blue light-emitting material.

14 Claims, 2 Drawing Sheets

ORGANIC OPTO-ELECTRONIC POLYMER AND USE THEREOF

FIELD OF THE INVENTION

The present invention provides an organic opto-electronic material, which can be used in the light-emitting layer of an organic light-emitting element as a blue light-emitting material.

BACKGROUND OF THE INVENTION

An Organic Light Emitting Diode (OLED), first published by KODAK Co. in 1987, is a display element that utilizes the light-emitting properties of an organic light-emitting material itself to achieve the displaying effect. An OLED consists mainly of a pair of electrodes and an organic light-emitting layer, wherein the organic light-emitting layer contains a light-emitting material. When an electric current is passing between a transparent anode and a metallic cathode, an electron and a hole will combine in the light-emitting material to produce an exciton, thereby causing the light-emitting material to emit light.

Fluorenes having the following chemical structure are generally used as blue light-emitting material in an organic light-emitting diode:

(Fluorene Structure and the Numbers of Carbons on the Structure)

The main reasons for this are: (1) It has been found from previous studies that the fluorescence emitting wavelength of polyfluorenes ranges from 400 to 460 nm (blue light), and the polyfluorenes exhibit good thermal and chemical stabilities, thus making them suitable to be used as the main component of an organic blue light-emitting luminophor; and (2) In either solution state or solid state, the fluorescence quantum yield of polyfluorenes is good (60-804), and when used in light-emitting elements, the polyfluorenes will provide the light-emitting elements with a better light-emitting efficiency.

However, it was found during the development that polyfluorenes tend to stack, leading to a decrease in the light-emitting efficiency of the element. Therefore, the present invention provides a chiral fluorene polymer material to address the stacking problem associated with fluorenes.

SUMMARY OF THE INVENTION

The object of the present invention is to provide an organic opto-electronic polymer, which can be used as an organic light-emitting layer material, and has good light-emitting efficiency.

The organic opto-electronic polymer of the invention is a chiral fluorene polymer material having the structure of formula (I):

Formula (I)

wherein:
$n_1$, $n_2$ and $n_4$ are each an integer greater than 1;
$n_3$ is 0 or an integer greater than 1;
X and Y are independently a substituted or an unsubstituted $C_4$-$C_{60}$ aromatic unit or aliphatic unit; and
$G^1$, $G^2$, $G^3$ and $G^4$ are each independently a substituted or an unsubstituted $C_2$-$C_{40}$ aromatic group or aliphatic group;
wherein $G^1$ and $G^2$ are different, and when $n_3$ is not 0, X and Y are different, and when $n_3$ is 0, X is not

DETAILED DESCRIPTION OF THE INVENTION

In order to enhance the light-emitting efficiency of an element, and to avoid the stacking of fluorenes, the present invention employs two different substituents, $G^1$ and $G^2$, for being attached at position 9 of a fluorene; and in the polymerization of the polymer, two different substituents, X and Y, are attached at positions 2 and 7 of the fluorene, respectively, so that the carbon atom at position 9 becomes a chiral center, and the is synthesized polymer may be in an R-configuration or S-configuration. When an R-configuration or S-configuration is respectively introduced into the entire polymer chain in view of the bonding order, stacking is less likely to occur because of the difference in the structure of each polymer chain.

In the polymer of formula (I) of the present invention which has at least one chiral center, $n_1$, $n_2$ and $n_4$ are preferably each an integer from 1 to 300, $n_3$ is 0 or an integer from 1 to 300; X and Y are each a substituted or an unsubstituted $C_6$-$C_{40}$ aromatic unit or aliphatic unit; and $G^1$, $G^2$, $G^3$ and $G^4$ are each a substituted or an unsubstituted $C_6$-$C_{30}$ aromatic groups or aliphatic groups, provided that $G^1$ and $G^2$ are different.

According to a preferred embodiment of the present invention, in the above formula (I), when $n_3$ is not 0, X and Y are $C_6$-$C_{40}$ aromatic units, provided that they are different; and according to another preferred embodiment of the present invention, when $n_3$ is 0, X is a $C_6$-$C_{40}$ aromatic unit, provided that X is not

According to a preferred embodiment of the present invention, X and Y are each for example, but are not limited to, the following aromatic units:

In the above formulae, each R represents a $C_1$-$C_{16}$ alkyl or $C_1$-$C_{16}$ alkoxy; and r is 0, 1, 2 or 3; and $G^1$, $G^2$, $G^3$ and $G^4$ are each a substituted or an unsubstituted $C_6$-$C_{30}$ aromatic groups, preferably phenyl or a phenyl mono-, di- or tri-substituted by $C_1$-$C_{16}$ alkyl (preferably $C_1$-$C_{10}$ alkyl) or $C_1$-$C_{16}$ alkoxy (preferably alkoxy is preferred).

The average molecular weight of the polymer of formula (I) of the present invention ranges from about 30,000 to 3,000,000, preferably from about 50,000 to 1,200,000.

The organic opto-electronic polymer of formula (I) of the present invention can be used in an organic light-emitting diode element as a light-emitting layer material. The polymer of the present invention can be incorporated into an organic light-emitting diode element as a light-emitting layer material or part of the light-emitting layer material by any method well known in the art. In other words, the material of the present invention can be blended together with other materials at various ratios prior to being coated onto an element as a light-emitting layer material. The light-emitting layer mate- rial containing the organic light-emitting material of the present invention has the property of emitting blue light, while exhibiting good light-emitting efficiency.

It is known to persons skilled in the technical field of organic light-emitting diode elements that if a light-emitting layer is doped, for example, by a doping technique, such that a fluorene polymer material having a chiral center is used as the body material of the light-emitting layer and acts as the energy-donating host, or a fluorene polymer material having a chiral center is used as a guest light-emitting dopant and acts as an energy-accepting guest, the light-emitting efficiency of the organic light-emitting diode element can be further enhanced and the light-emitting color can be adjusted.

The following examples are intended to further illustrate to the invention, but are not intended to be construed as limitations on the protection scope of the invention. All modifications and alterations which may be readily achieved by persons skilled in the art fall within the scope of the disclosure of the specification.

Preparation of Fluorene Derivatives

The 9 position of fluorene can be easily oxidized to a ketone group, thus allowing the carbon on position 9 to partially carry positive charges, then an aryl can be attached at position 9 by utilizing aryl Grignard reagent, and then a second aryl can be attached at position 9 by Friedel-Crafts reaction. In this way, a 9,9-diaryl-substituted fluorene intermediate can be prepared (such as the starting material 1, 2 or 3 as shown in Scheme I). In addition, starting material 4 can be obtained directly by the reaction of 2,7-dibromofluorene and 1-bromooctane under basic conditions (as shown in Scheme II).

Preparation of Polymeric Monomer

Starting materials 5a and 5b can be obtained by the reaction of carbazole and 1-bromo-4-t-butylbenzene under the catalysis of palladium, then bromized with N-bromosuccinimide (NBS) to afford polymeric monomers 6a and 6b (as shown in Scheme III).

Scheme III

5a

6a

5b

6b

Furthermore, polymeric monomer 7 can be obtained by replacing the bromine atoms of the starting material 1 with borates in the presence of n-butyl lithium (as shown in Scheme IV).

Scheme IV

Furthermore, polymeric monomer 8 can be obtained by the reaction of the polymeric monomer 7 with 2-iodo-5-bromopyrimidine under the catalysis of palladium as shown in Scheme V).

Scheme V

Polymeric monomers 9a and 9b can be obtained by the reaction of 2-methyl-4-bromobenzoyl chloride with 3-methyl-4-bromobenzoyl (or 3-bromo-4-methyl benzoylhydrazine) under basic conditions, and then by the dehydration and cyclization with $POCl_3$ (as shown in Scheme VI).

Scheme VI

Polymerization Reactions

The starting material 2, the monomer 6a and the monomer 7 were mixed to achieve a Suzuki coupling reaction, providing a chiral fluorene polymer P1 (as shown in Scheme VII). The molecular weight thereof is 42874, and the polydispersity (PDI) of the molecular weight is 1.77. Each molecular chain of this polymer on its structure has different optical active centers.

Scheme VII

The starting material 3, the monomer 7 and the monomer 8 were mixed to achieve a Suzuki coupling reaction, providing a chiral fluorene polymer P2 (as shown in Scheme VIII). The molecular weight thereof is 44068, and the polydispersity (PDT) of the molecular weight is 1.89. Each molecular chain of this polymer has different optical active centers on its structure.

The starting material 3, the monomer 6b and the monomer 7 were mixed to achieve a Suzuki coupling reaction, providing a chiral fluorene polymer P3 (as shown in Scheme IX). The molecular weight thereof is 39183, and the polydispersity (PDI) of the molecular weight is 2.03. Each molecular chain of this polymer has different optical active centers on its structure.

-continued

3

P3

The starting material 2, the monomer 7 and the monomer 8 were mixed to achieve a Suzuki coupling reaction, providing a chiral fluorene polymer P4 (as shown in Scheme X). The molecular weight thereof is 81665, and the polydispersity (PDI) of molecular weight is 2.05. Each molecular chain of this polymer has different optical active centers on its structure.

Scheme X 7                                8

3

-continued

P4

The starting material 6b, the monomer 7 and the monomer 4 were mixed to achieve a Suzuki coupling reaction, providing a chiral fluorene polymer P5 (as shown in Scheme XI). The molecular weight thereof is 83405, and the polydispersity (PDI) of molecular weight is 1.88. Each molecular chain of this polymer has different optical active centers on its structure.

Scheme XI

P5

The starting material 2, the monomer 9b and the monomer 7 were mixed to achieve a Suzuki coupling reaction, providing a chiral fluorene polymer P6 (as shown in Scheme XII). The molecular weight thereof is 35128, and the polydispersity (PDI) of molecular weight is 1.64. Each molecular chain of this polymer has different optical active centers on its structure.

Scheme XII

The starting material 2, the monomer 9a and the monomer 7 were mixed to achieve a Suzuki coupling reaction, providing a chiral fluorene polymer P7 (as shown in Scheme XIII). The molecular weight thereof is 33401, and the polydispersity (PDI) of molecular weight is 1.58. Each molecular chain of this polymer has different optical active centers on its structure.

Scheme XIII

-continued

P7

The starting material 2, the monomer 9a,9,10-dibromoanthracene and the monomer 7 were mixed to achieve a Suzuki coupling reaction, providing a chiral fluorene polymer P8 (as shown in Scheme XIV). The molecular weight thereof is 197456, and the polydispersity (PDI) of the molecular weight is 2.18. Each molecular chain of this polymer has different optical is active centers on its structure.

Scheme XIV

-continued

P8

Opto Physical Properties of Chiral Fluorenes

Figure 1:
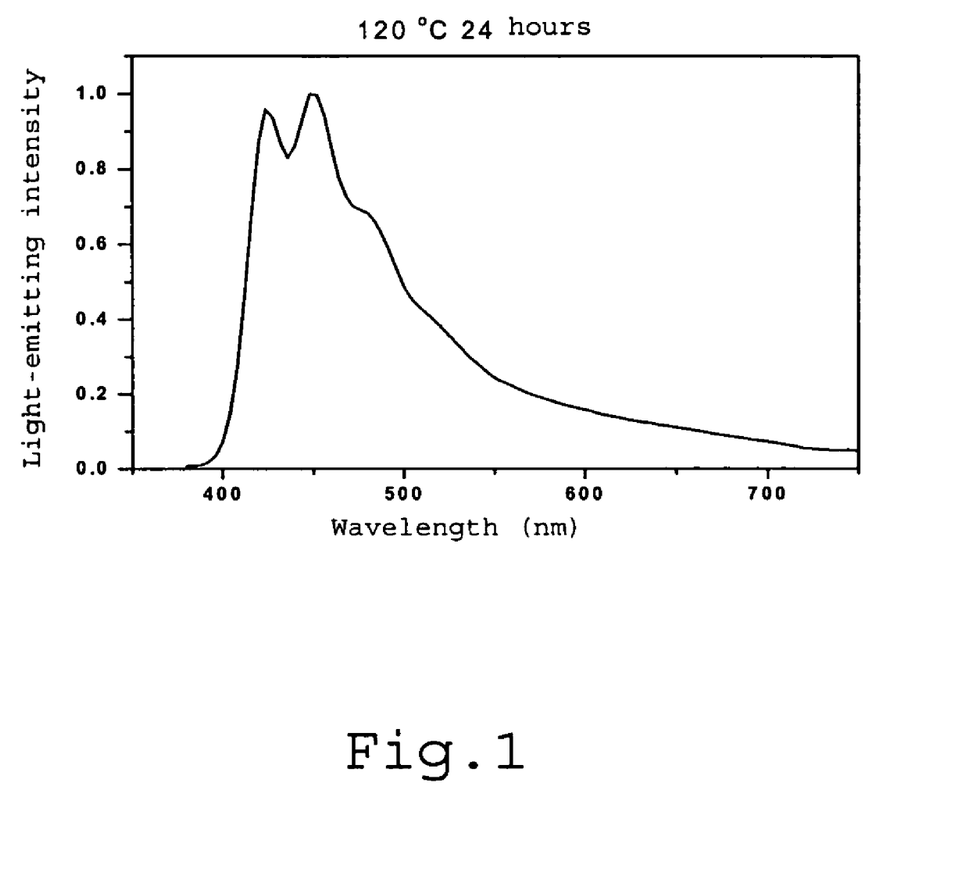
FIG. 1 represents the EL spectrum measured for an element prepared at a high temperature for a long time (120° C., 24 hours).
Figure 2:
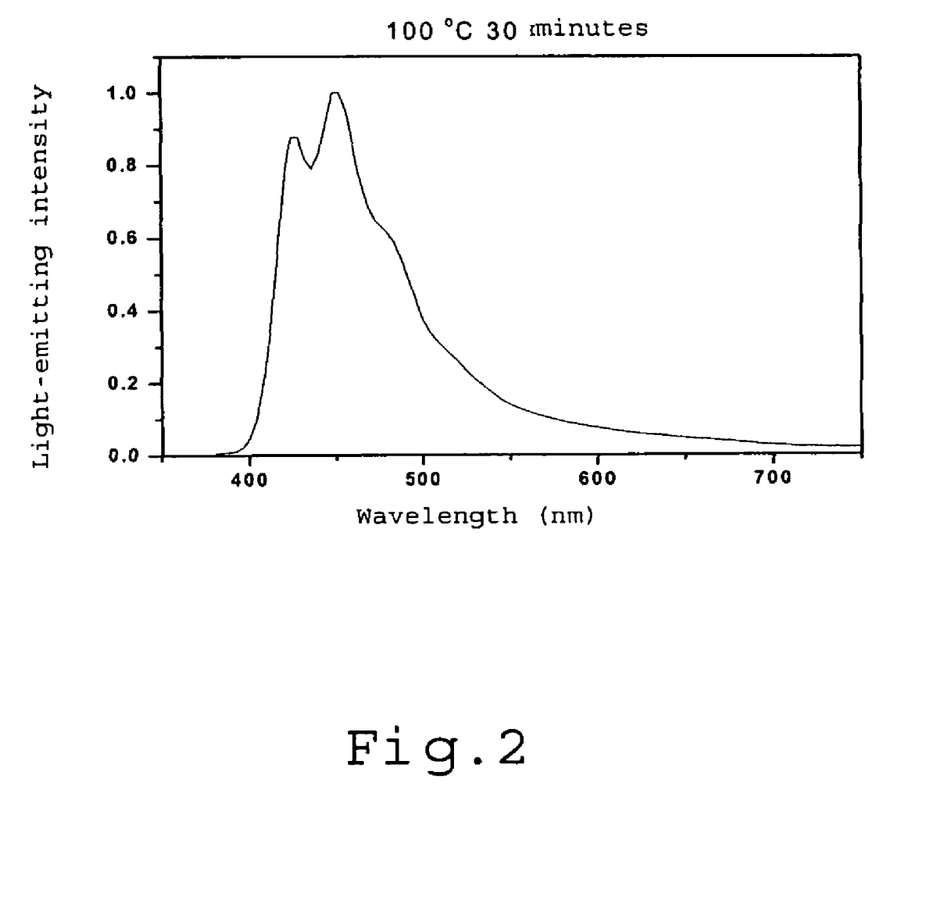
FIG. 2 represents the EL spectrum measured for an element prepared at a low temperature for a short time (100° C., 30 minutes).

The synthesized polymers were dissolved in toluene at a concentration of 1% to 3% and coated onto an ITO glass surface by a spin coating method at 500 rpm to 3000 rpm to form a thin film. The film was then plated with an aluminum electrode under a pressure of $5.0 \times 10^{-6}$ torr, driven by applying 3 to 20 volts, and measured for the electroluminescent spectrum with a PR650 photometer from KODAK. FIG. 1 and FIG. 2 represent the EL spectra for the elements prepared at a high temperature for a long time (120° C., 24 hours) and at a low temperature for a short time (100° C., 30 minutes), respectively.

TABLE

Physical Properties of Polymers

| Polymer | Mw | Mn | Mw/Mn | Maximum Absorption Wavelength | Maximum Emission Wavelength |
|---|---|---|---|---|---|
| P1 | 42874 | 24130 | 1.77 | 389 | 421 |
| P2 | 44068 | 23346 | 1.89 | 388 | 421 |
| P3 | 89183 | 39833 | 2.03 | 386 | 420 |
| P4 | 81665 | 39833 | 2.05 | 390 | 421 |
| P5 | 83405 | 44280 | 1.88 | 387 | 419 |
| P6 | 35128 | 21468 | 1.64 | 386 | 424 |
| P7 | 33401 | 21117 | 1.58 | 385 | 424 |
| P8 | 197456 | 90466 | 2.18 | 389 | 446 |

Note:
Absorption and emission wavelength data were measured for the polymers dissolved in chloroform.

It can be found from the data of FIG. 1 and FIG. 2 that, the element prepared from the polymeric thin film by heating at a high temperature for a long time (120° C., 24 hours) is not significantly different from that prepared by heating at a low temperature for a short time (100° C., 30 minutes). Therefore, it can be concluded that the chiral centers introduced according to the present invention prevent the stacking of the polymeric chains.

What is claimed is:

1. An organic opto-electronic polymer having a structure of formula (I):

Formula (I)

wherein:

$n_1$, $n_2$ and $n_4$ are each an integer greater than or equal to 1;

$n_3$ is 0 or an integer greater than 1;

X and Y are independently a substituted or an unsubstituted $C_4$-$C_{60}$ aromatic units; and wherein $G^1$, $G^2$, $G^3$ and $G^4$ are each phenyl or a phenyl mono-, di- or tri-substituted by $C_1$-$C_{16}$ alkyl or $C_1$-$C_{16}$ alkoxy;

wherein $G^1$ and $G^2$ are different, and when $n_3$ is not 0, X and Y are different, and when $n_3$ is 0, X is not 2. The organic opto-electronic polymer according to claim 1, having at least one chiral center.

3. The organic opto-electronic polymer according to claim 1, wherein $n_1$, $n_2$ and $n_4$ are each an integer from 1 to 300; and $n_3$ is 0.

4. The organic opto-electronic polymer according to claim 1, wherein $n_3$ is 0; X is a $C_6$-$C_{40}$ aromatic unit, but is not 5. The organic opto-electronic polymer according to claim 1, having an average molecular weight ranging from 30,000 to 3,000,000.

6. The organic opto-electronic polymer according to claim 5, having an average molecular weight ranging from 40,000 to 1,200,000.

7. A light-emitting layer for use in an organic light-emitting element, comprising the organic opto-electronic polymer according to claim 1.

8. An organic opto-electronic polymer having a structure of formula (I):

Formula (I)

wherein:

$n_1$, $n_2$ and $n_4$ are each an integer greater than or equal to 1;
$n_3$ is 0;
X is $C_4$-$C_{60}$ aromatic unit, but is not and $G^1$, $G^2$, $G^3$ and $G^4$ are each phenyl or a phenyl mono-, di- or tri-substituted by $C_1$-$C_{16}$ alkyl or $C_1$-$C_{16}$ alkoxy, and $G^1$ and $G^2$ are different.

9. The organic opto-electronic polymer according to claim 8, having at least one chiral center.

10. The organic opto-electronic polymer according to claim 8, wherein $n_1$, $n_2$ and $n_4$ are each an integer from 1 to 300.

11. The organic opto-electronic polymer according to claim 8, wherein X is a $C_6$-$C_{40}$ aromatic unit, but is not 12. The organic opto-electronic polymer according to claim 8 having an average molecular weight ranging from 30,000 to 3,000,000.

13. The organic opto-electronic polymer according to claim 8 having an average molecular weight ranging from 40,000 to 1,200,000.

14. A light-emitting layer for use in an organic light-emitting element comprising the organic opto-electronic polymer according to claim 8.

* * * * *